(12) United States Patent
Johri et al.

(10) Patent No.: US 10,272,907 B2
(45) Date of Patent: Apr. 30, 2019

(54) SYSTEM AND METHOD FOR FAST ENGINE STARTS WITH BELT INTEGRATED STARTER GENERATOR ASSIST DURING LOCKING OF DISCONNECT CLUTCH

(71) Applicant: Ford Global Technologies, LLC, Dearborn, MI (US)

(72) Inventors: Rajit Johri, Canton, MI (US); Mark Steven Yamazaki, Canton, MI (US); Fazal Urrahman Syed, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 146 days.

(21) Appl. No.: 15/412,090

(22) Filed: Jan. 23, 2017

(65) Prior Publication Data
US 2018/0208179 A1 Jul. 26, 2018

(51) Int. Cl.
*B60W 10/02* (2006.01)
*B60W 10/06* (2006.01)
*B60W 20/40* (2016.01)
*B60K 6/48* (2007.10)
*F02N 11/04* (2006.01)
*B60K 6/485* (2007.10)
*B60W 10/08* (2006.01)
*B60K 6/26* (2007.10)

(52) U.S. Cl.
CPC .............. *B60W 20/40* (2013.01); *B60K 6/48* (2013.01); *B60K 6/485* (2013.01); *B60W 10/02* (2013.01); *B60W 10/06* (2013.01); *B60W 10/08* (2013.01); *F02N 11/04* (2013.01); *B60K 2006/268* (2013.01); *B60K 2006/4825* (2013.01); *B60W 2510/0208* (2013.01); *B60W 2510/0241* (2013.01); *B60W 2510/0275* (2013.01); *B60W 2510/0633* (2013.01); *B60W 2510/0638* (2013.01); *B60W 2510/081* (2013.01); *B60W 2540/06* (2013.01); *B60W 2710/021* (2013.01); *B60W 2710/06* (2013.01); *B60W 2710/0638* (2013.01); *B60W 2710/0644* (2013.01); *B60W 2710/0666* (2013.01); *B60W 2710/083* (2013.01); *B60Y 2200/92* (2013.01); *F02N 2200/042* (2013.01); *Y02T 10/6286* (2013.01); *Y10S 903/93* (2013.01)

(58) Field of Classification Search
CPC ...... B60W 10/02; B60W 10/06; B60W 20/40; B60W 2510/0638; B60W 2710/021; B60W 2710/0644; B60W 2710/0666
See application file for complete search history.

(56) References Cited

U.S. PATENT DOCUMENTS

| 6,775,601 B2 | 8/2004 | MacBain |
| 9,409,565 B2 | 8/2016 | Bureau et al. |
| 9,656,666 B2 * | 5/2017 | Wang .................. B60W 20/40 |

(Continued)

*Primary Examiner* — David R Morris
(74) *Attorney, Agent, or Firm* — David Kelley; Brooks Kushman, P.C.

(57) ABSTRACT

A controller is configured to respond to an engine start command, operate the engine to produce excess torque beyond a demand torque, and in response to engine speed achieving a threshold, operate the starter-generator to load the engine to consume the excess torque and drive the engine speed toward an electric machine speed, and engage a clutch to couple the engine and an electric machine.

8 Claims, 3 Drawing Sheets

(56) References Cited

U.S. PATENT DOCUMENTS

2014/0180522 A1* 6/2014 Ideshio .................... B60K 6/48
                                                      701/22
2015/0114322 A1  4/2015 Kamijo et al.
2016/0059846 A1* 3/2016 Wang ..................... B60W 20/40
                                                       477/5
2016/0137191 A1* 5/2016 Bang ..................... B60W 10/08
                                                      701/22

* cited by examiner

SYSTEM AND METHOD FOR FAST ENGINE STARTS WITH BELT INTEGRATED STARTER GENERATOR ASSIST DURING LOCKING OF DISCONNECT CLUTCH

TECHNICAL FIELD

The present disclosure relates to control systems for hybrid vehicles.

BACKGROUND

During engine starts in a hybrid vehicle it may be difficult to match the speed of the engine with the speed of the electric machine. Matching the engine speed with the speed of the electric machine may prevent driveline disturbances as the engine is connected to the driveline. The speed of the engine may need to be reduced during engine starts, requiring spark retardation.

SUMMARY

According to one embodiment of this disclosure, a vehicle having an engine, a starter-generator, and a controller is disclosed. The controller is configured to respond to an engine start command, operate the engine to produce excess torque beyond a demand torque, and in response to engine speed achieving a threshold, operate the starter-generator to load the engine to consume the excess torque and drive the engine speed toward an electric machine speed, and engage a clutch to couple the engine and an electric machine.

According to another embodiment of this disclosure, a method of controlling a vehicle powertrain is disclosed. The method may include receiving an engine start command, increasing and maintaining an excess engine torque above a demand torque, applying a load to the engine to consume the excess torque in response to engine speed achieving a threshold, and subsequently engaging a disconnect clutch to connect the engine with a driveline of the vehicle.

According to another embodiment of this disclosure, a controller is disclosed. The controller may include an input channel configured to receive signals indicative of engine speed as well as an output channel configured to provide commands to operate a starter-generator that is coupled to an engine. The controller may also include control logic programmed to operate the engine to produce excess torque beyond a demand torque in response to an engine start command, operate the starter generator to load the engine to consume the excess torque and increase the engine speed toward an electric machine speed, and engage a clutch to couple the engine to a driveline.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In a hybrid vehicle the engine may be started using a disconnect clutch, a starter, or belt integrated starter/alternator (ISG). Using an ISG is one way to isolate the engine from the drive line while starting. Because the engine is isolated, the engine is unencumbered by the weight of the other drivetrain components that would otherwise be connected while starting, so it is more efficient. But it is still desirable to connect the engine and provide the driver the demanded torque in response to a large accelerator tip-in. Before connecting the engine to the drivetrain, it is advantageous to have the rate of change of the engine speed match the rate of change of the impeller to prevent driveline shock. To achieve the same rate of change between the engine speed and the impeller, the torque of the engine must be reduced before connection. One way to accomplish this reduction in torque is by applying a load to the engine by the BISG.

Figure 1:
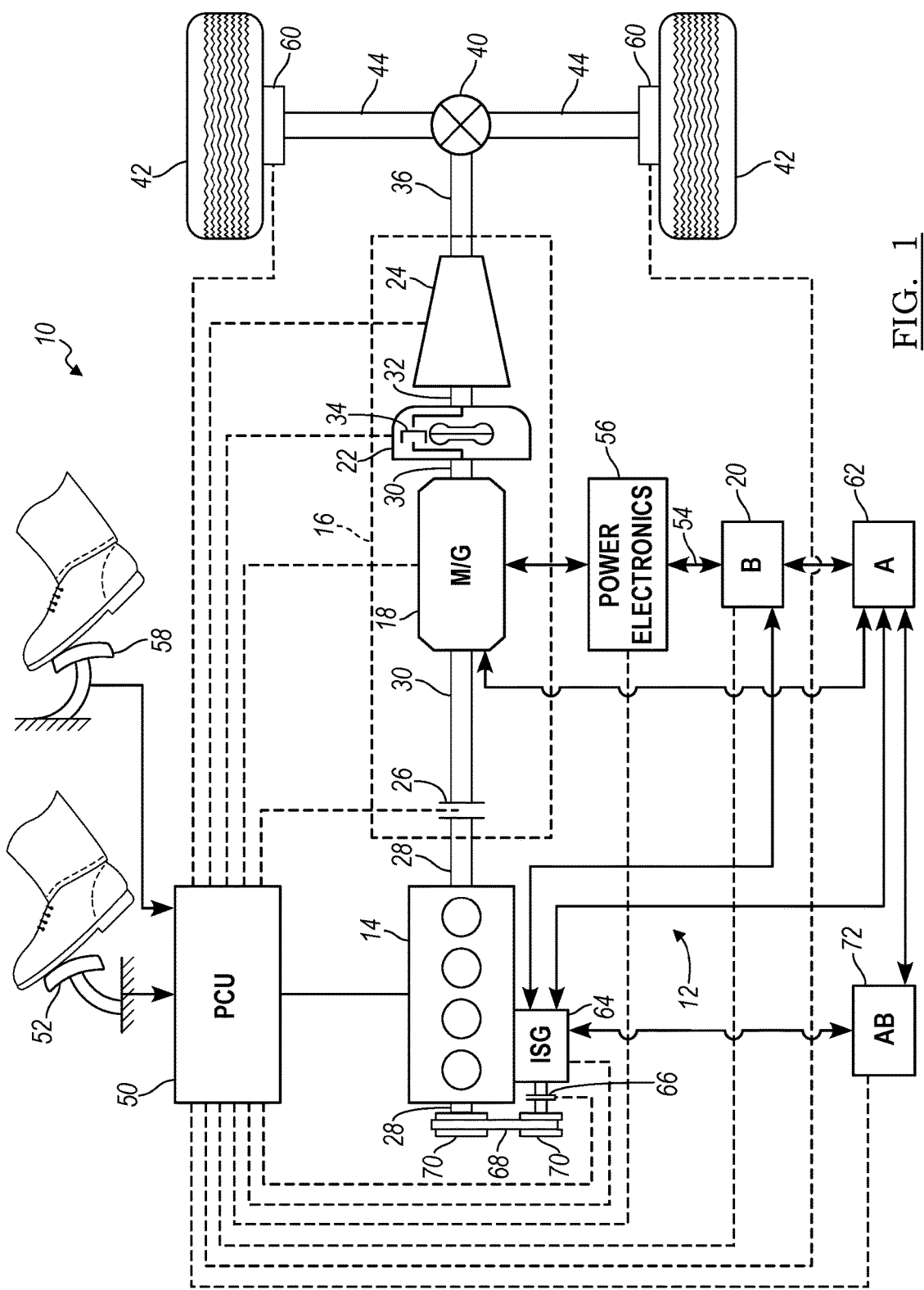
FIG. 1 is a schematic of an example hybrid vehicle according to one or more embodiments of this disclosure.

Referring to FIG. 1, a schematic diagram of a hybrid electric vehicle (HEV) 10 is illustrated according to an embodiment of the present disclosure. The HEV 10 includes a powertrain 12. The powertrain 12 includes an engine 14 that drives a transmission 16, which may be referred to as a modular hybrid transmission (MHT). As will be described in greater detail below, the transmission 16 includes an electric machine, e.g. an electric motor/generator (M/G) 18, an associated traction battery 20, a torque converter 22, and a multiple step-ratio automatic transmission, or gearbox 24.

The engine 14 and the M/G 18 both act as drive sources and are configured to propel the HEV 10. The engine 14 may be an internal combustion engine fueled by gasoline, diesel, or natural gas, or a fuel cell. The engine 14 generates an engine power and corresponding engine torque that is supplied to the M/G 18 when a disconnect clutch 26 between the engine 14 and the M/G 18 is at least partially engaged. The M/G may be a permanent magnet synchronous motor or any one of a various type of electric machines. Power electronics facilitate a flow of direct current (DC) power provided by the battery 20 to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, a launch clutch similar to disconnect clutch 26 may be provided between the M/G 18 and gearbox 24 for applications that do not include a torque converter 22 or a torque converter bypass clutch 34.

The gearbox 24 is a gearing arrangement that includes a collection of rotating elements and clutches configured to impose specified speed relationships among elements. Some speed relationships, called fixed speed relationships, are imposed regardless of the state of any clutches. A gearing arrangement imposing only fixed relationships is called a fixed gearing arrangement. Other speed relationships are imposed only when particular clutches are fully engaged. A gearing arrangement that selectively imposes speed relationships is called a shiftable gearing arrangement. A discrete ratio transmission has a shiftable gearing arrangement that selectively imposes a variety of speed ratios between an input shaft and an output shaft.

A group of elements are fixedly coupled to one another if they are constrained to rotate as a unit in all operating conditions. Elements can be fixedly coupled by spline connections, welding, press fitting, machining from a common solid, or other means. Slight variations in rotational displacement between fixedly coupled elements can occur such as displacement due to lash or shaft compliance. In contrast, two elements are selectively coupled by a clutch when the clutch constrains them to rotate as a unit whenever the clutch is fully engaged and they are free to rotate at distinct speeds in at least some other operating condition. Clutches include actively controlled devices such as hydraulically or electrically actuated clutches and passive devices such as one way clutches. A clutch that holds an element against rotation by selectively connecting the element to the housing may be called a brake.

The gearing arrangement is controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

The output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VS S), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

An integrated starter-generator (ISG) 64 may be coupled to the engine 14 (i.e., may be coupled to the crankshaft 28 of the engine 14). The ISG 64 may be configured to operate as a motor to start the engine 14 during an engine start-up event, or to provide additional torque to the powertrain 12 during vehicle operations. The ISG 64 may also be configured to receiving torque from the engine 14 and operate as a generator. The ISG 64 may be selectively coupled to the engine by a clutch 66, belt 68, and a pair of pulleys 70. If the ISG 64 is coupled to the engine by a belt 68, it may be referred to as a belt integrated starter-generator (BISG). The controller 50 may be configured to transmit signals to the ISG 64 to operate the ISG 64 as either a motor or a generator. The controller may also be configured to transmit signals to the clutch 66 in order to open or close the clutch 66. The ISG 64 will be coupled to the engine 14 when the clutch is in a closed state and decoupled from the engine 14 when the clutch 66 is in an open state. The ISG 64 may be configured to provide electrical energy to charge an accessory battery 72, the traction battery 20, or provide electrical energy to power the vehicle accessories 62 when operating as a generator. The accessory battery 72 may also be configured to power the vehicle accessories 62.

The controller 50 may be configured to receive various states or conditions of the various vehicle components illustrated in FIG. 1 via electrical signals. The electrical signals may be delivered to the controller 50 from the various components via input channels. Additionally, the electrical signals received from the various components may be indicative of a request or a command to change or alter a state of one or more of the respective components of the vehicle 10. The controller 50 includes output channels that are configured to deliver requests or commands (via electrical signals) to the various vehicle components. The controller 50 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

Figure 2:
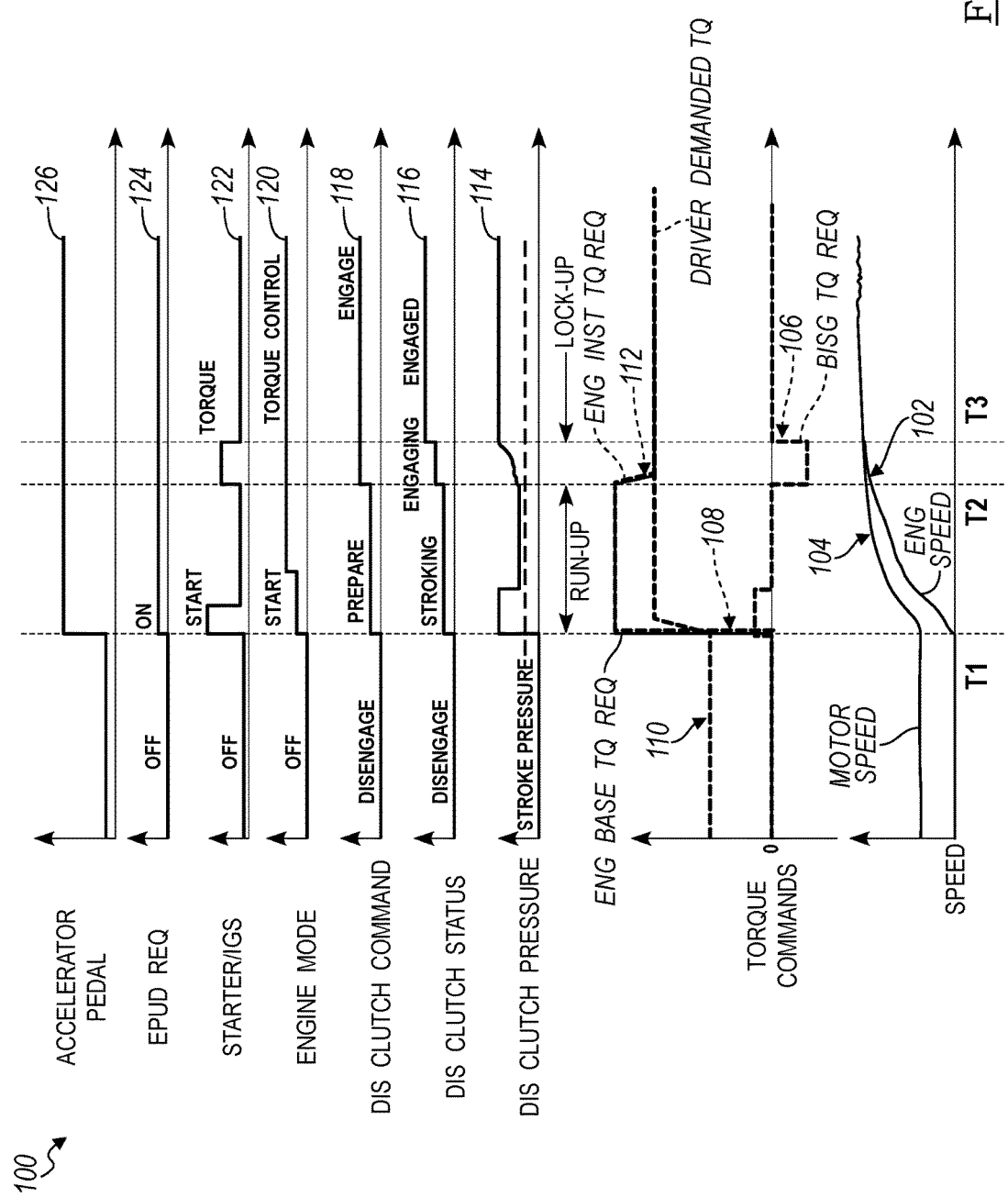
FIG. 2 is a graph illustrating the status of vehicle components, and speed and torque characteristics of the vehicle during a startup condition.

Referring to FIG. 2, a graph 100 representative of engine speed, motor/generator speed, engine torque, disconnect clutch pressure, disconnect clutch status, disconnect clutch command, engine mode, starter/integrated starter generator status, engine pull up and pull down request, and accelerator pedal position. The speed of the engine 14 plotted against time is represented by line 102, the speed of the M/G 18 plotted against time is represented by line 104. Line 106 represents the ISG 64 torque request, line 108 represents an engine base torque request, line 110 represents driver demanded torque 110, and line 112 represents engine instant torque request. The driver demanded torque may be adjusted for energy management torque, also known as charging torque. Charging torque is the torque required to maintain charge of the high-voltage battery. The pressure of the disconnect clutch 26 and the status of the disconnect clutch 26 are represented by lines 114 and 116, respectively. As pressure is applied to the disconnect clutch between T1 and T2, the disconnect clutch is stroking. As the disconnect clutch is stroked, the disconnect clutch engages between T2 and T3 and become engaged after T3 as represented by line 116. Line 118 represents the command provided by the controller 50 to the disconnect clutch, between the origin and T1, the clutch is disengaged. Between T1 and T2 the disconnect clutch is prepared for engagement. After T2 the disconnect clutch 26 is commanded to be engaged. The engine mode is represented by line 120. Between the origin and T1 the engine mode is off. Between T1 and T2, the engine begins to start and starts after the T3 engine mode is in torque control mode.

Line 122 represents the mode of the ISG 64. Between the origin and T1, the engine is off and so is the ISG 64. Between T1 and T2, the ISG, upon receiving a command from the controller 50, starts the engine 14. After acting to start the engine, the ISG 64 provides a torque or load on the engine 14 between T1 and T2. Lines 124 and 126 represent the engine pull up-down (EPUD) requests and the position of the accelerator, respectively. An EPUD may be an algorithm within the controller that determines if a request for engine start or stop is present. The accelerator pedal is shown as slightly pressed between the origin and T1. Upon reaching T1 the driver has "tipped in" by pressing down on the accelerator pedal.

Figure 3:
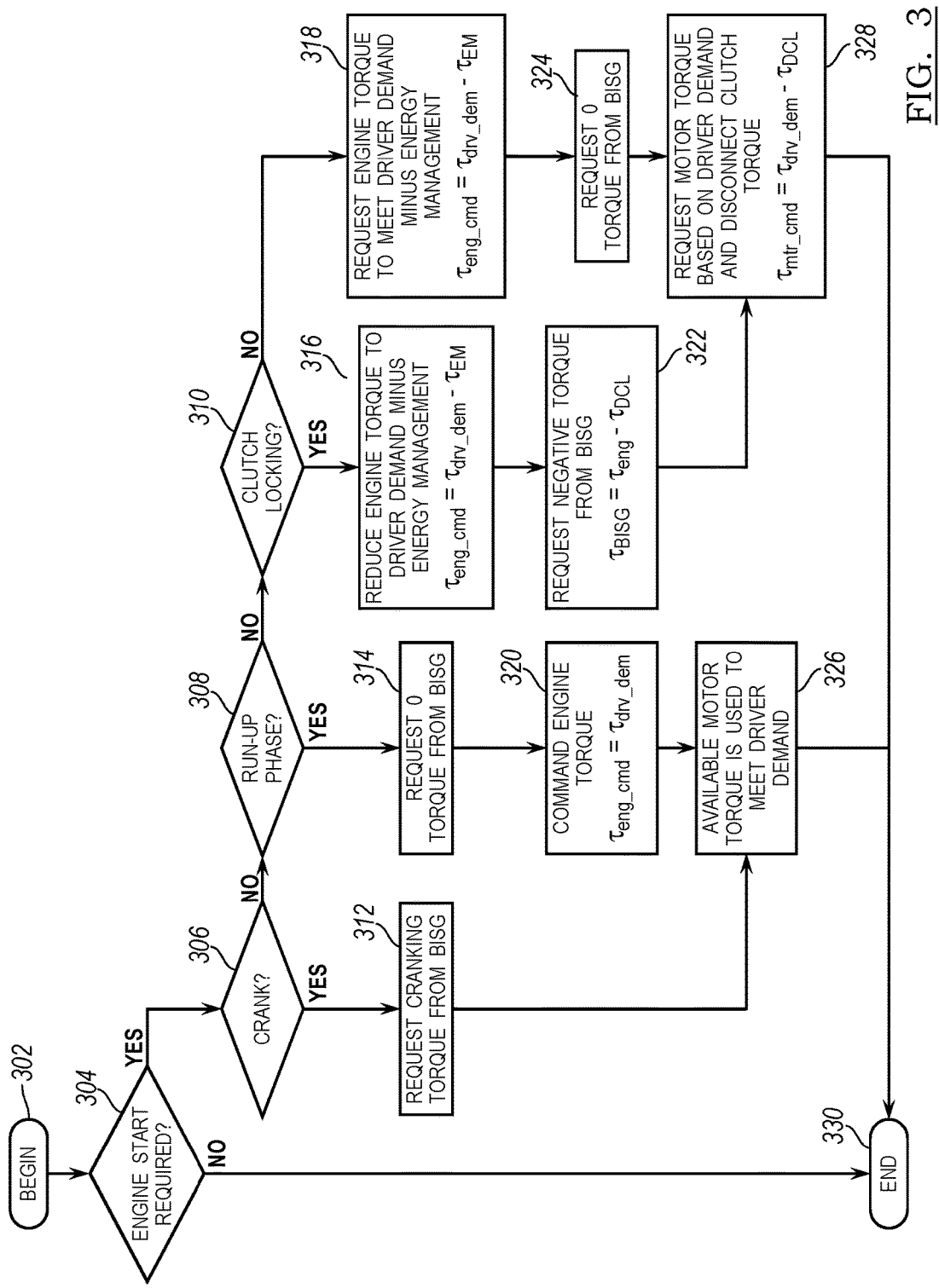
FIG. 3 is a control diagram illustrating a method for controlling the engine and the integrated starter-generator during the engine start-up event.

Referring to FIG. 3, a control diagram representative for a method 300 for controlling the engine 14 and the ISG 64 during the engine start-up event is illustrated. The method 300 is implemented by the controller 50 to control the engine 14 torque and speed. The method begins at 302 and determines if an engine start is required at 304. An engine start may be required if the M/G 18 does not produce sufficient torque and speed to meet the driver's demand. At node 306, the controller 50 determines whether the engine should begin cranking. To crank an engine means to actuate the flywheel by a starter or an ISG 64 to start the engine 14. In another embodiment, the disconnect clutch may also crank the engine. If cranking is requested, the torque required to crank the engine is requested from the ISG 64 at node 312.

After the ISG 64 has provided the requested torque, the available motor torque is used to meet the driver's demand at node 326.

Referring back to node 306, if the engine has finished cranking, the controller 50 determines whether a run-up phase is complete at step 308. In the "run-up" phase, it is desired to have the engine speed quickly rise to the target motor speed. During the run-up phase, the base torque and instantaneous torque commands are equal to each other. Here, the excess engine torque is used to accelerate the engine to meet the speed of the motor. Additionally, the engine air path components such as throttle, intake, exhaust valve timing and a turbocharger wastegate are altered to facilitate greater air flow to meet the torque requirement after the engine connects to the driveline. This is particularly useful in turbo-charged engines where high engine torque cannot develop until the turbo charger spools up. If yes to a run-up phase, the controller 50 does not request any torque from the ISG 64 at node 314. The run-up phase is completed when the engine speed reaches a predetermined speed below the speed of the motor. At step 320, the controller may request the commanded engine torque to be higher than the torque demanded by the driver, to bring the engine speed to the desired speed as fast as possible.

If the controller determines the run-up phase at step 308 is complete, the controller then determines whether the clutch is locking at node 310. If the clutch is locking, the controller acts to reduce engine torque to the driver demanded torque minus the torque required for energy management at node 316. From node 316, the controller requests a negative torque from the ISG 64 at node 322. From 322, the requested motor torque is based on the driver demand and the torque of the disconnect clutch 26 at node 328. If the locking phase of the clutch is completed at step 310, the requested engine torque is the torque to meet the driver demanded torque minus the torque required for energy management at 318. At node 324, the requested torque from the ISG 64 is zero. After node 324, the requested motor torque based on driver demand is equal to the disconnect clutch torque at step 328.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling a vehicle engine and starter-generator comprising:
   in response to receiving a start command, increasing an engine torque above a demand torque to generate excess torque;
   in response to engine speed achieving a threshold, applying a load to the engine by decreasing a starter-generator torque to consume the excess torque; and
   engaging a disconnect clutch to connect the engine with a driveline of the vehicle immediately after applying the load.

2. The method of claim 1, wherein the engaging occurs after the engine and electric machine speeds are same.

3. The method of claim 1, wherein the excess engine torque and the demand torque, adjusted for an energy-management torque, are same after the disconnect clutch is locked.

4. The method of claim 1, wherein the increasing causes a turbocharger coupled to the engine to achieve a desired speed within a target duration before the engaging.

5. The method of claim 1, wherein the threshold is defined by a target engine exhaust air flow rate.

6. The method of claim 1, wherein the demand torque is based on a position of an accelerator pedal.

7. The method of claim 1, wherein after applying the load to the engine, the engine output torque is less than a torque capacity of the disconnect clutch.

8. The method of claim 1, wherein the starter-generator reduces the excess torque by an amount equal to a difference between the excess torque and the demand torque.

* * * * *